United States Patent [19]
Abts

[11] Patent Number: 6,006,355
[45] Date of Patent: Dec. 28, 1999

[54] PNEUMATIC CUFF SEAL FOR SPACESUIT

[75] Inventor: Kevin James Abts, Hermosa Beach, Calif.

[73] Assignee: AlliedSignal Inc., Morristown, N.J.

[21] Appl. No.: 09/143,151

[22] Filed: Aug. 28, 1998

[51] Int. Cl.⁶ .................................................. B64G 6/00
[52] U.S. Cl. .................................................. 2/2.11; 2/2.14
[58] Field of Search .............................. 2/455, 456, 457, 2/2.11–2.16, 6.1, 60, 243.1, DIG. 3

[56] References Cited

U.S. PATENT DOCUMENTS

| | | | |
|---|---|---|---|
| 2,762,047 | 9/1956 | Flagg et al. | 2/2.14 |
| 3,172,126 | 3/1965 | Spang et al. | 2/2.1 |
| 3,466,061 | 9/1969 | Bonardi | 2/2.12 |
| 3,534,408 | 10/1970 | Fifield | 2/2.1 |
| 3,731,319 | 5/1973 | O'Neill | 2/2.1 R |
| 4,015,295 | 4/1977 | Lancaster et al. | 2/2.1 R |
| 4,227,262 | 10/1980 | Insulan et al. | 2/2.1 R |
| 5,003,630 | 4/1991 | Bassick et al. | 2/2.1 A |
| 5,335,370 | 8/1994 | Bassick et al. | 2/2.14 |

FOREIGN PATENT DOCUMENTS

| | | | |
|---|---|---|---|
| 46608 | 8/1966 | United Kingdom | 2/2.14 |

*Primary Examiner*—John J. Calvert
*Assistant Examiner*—Tejash D Patel
*Attorney, Agent, or Firm*—Robert Desmond, Esq.

[57] ABSTRACT

A cuff seal for a spacesuit includes a rigid base member and a flexible seal member disposed within the base member. The seal member comprises a hinge portion and a contact portion extending therefrom. The contact portion is capable of flexing about the hinge portion and can be placed in pressure sealing contact with a blood supplied tissue, such as a wrist area, due to a gas pressure within the spacesuit.

16 Claims, 3 Drawing Sheets

PNEUMATIC CUFF SEAL FOR SPACESUIT

BACKGROUND OF THE INVENTION

The present invention generally relates to seals for pressurized garments. More specifically, the present invention relates to cuff seals for pressurized garments that can be used in low pressure environments such as outer space.

In environments having very small or no ambient gas pressure, such as high altitude or the vacuum of space, a person's respiration and circulatory balance can be problematic. Gaseous oxygen needs to be delivered to the person's lungs at a high enough pressure to cause diffusion into the blood. It has been found that an oxygen pressure of about 80 mm Hg is minimally needed for proper breathing. An oxygen pressure of about 160 mm HG is normally experienced at sea level. A pressure of about 222 mm Hg or 4.3 psi (100% oxygen) is the current design pressure of the NASA Extravehicular Mobility Unit (EMU) spacesuit.

As ambient gas pressure rises, blood pressure similarly rises. But for proper blood circulation, tissue pressure that substantially matches the blood pressure must exist. Otherwise, the circulating blood can rush into low pressure areas and pool. If tissue pressure is not sufficiently high, the veins (and particularly the small ones) will become engorged with blood. As venous engorgement continues, pressure within the veins and capillaries continues to increase. If the pressure exceeds about 10 mm Hg, measurable amounts of excess fluid can be forced through the capillary walls and accumulate in the tissues. The accumulation of fluid can result in edema and a decrease in the circulating blood volume.

To provide adequate pressure in the tissue to prevent pooling, various suits have been employed to provide a counter pressure on the tissue. In the context of space, one such suit has been a full pressure suit that is anthropomorphically shaped, gas-tight, and pressurized with oxygen. Typically, these suits have used a rigid but flexible pressure restraining outer garment. The fully pressurized suit is different from a partial pressure suit whereby the latter is partially pressurized by gas, as well as partially pressurized by an elastic material which supplies a mechanical counter pressure directly on the skin.

But, of course, a fully pressurized suit is only as beneficial as its ability to maintain pressure within the suit. Thus, concerns have existed about punctures to such suits that might cause a sudden and large pressure loss. Other concerns have focused on leaks that may cause a slow or small pressure loss but which, over time, may result in a large pressure loss. These small or slow leaks may be due to the design constraints of the suit itself, such as where a partial pressure boot joins a fully pressurized pant leg or where a partial pressure glove joins a fully pressurized sleeve. Those areas of the suit can create design difficulties since the suit needs to maintain a pressure seal at the joinder point while still allowing, for example, a foot to flex or a hand to rotate. Additional design difficulties exist since a pressure seal needs to be maintained and, at the same time, the seal needs to provide ease of donning and doffing.

A prior a cuff seal for use around a wrist (or ankle) of a full pressure suit is shown in U.S. Pat. No. 5,335,370. A partial pressure glove (or bootie) is contemplated for use with the full pressure suit. The cuff seal includes a gas impermeable outer sheath that is actually a part of the full pressure suit together with a gas impermeable inner sheath therein. One end of the inner sheath is sealed to the end of the outer sheath where the arm or leg protrudes. The inner sheath has a gas impermeable intermediate portion that becomes sealed to the arm or leg as gas pressure is introduced between the outer and inner sheaths. However, the design is somewhat complex and cumbersome in use. An example of a cuff seal that comprises an elastic band for an anti-contamination garment is shown in U.S. Pat. No. 5,555,561.

As can be seen, there is a need for an improved counter pressure garment for low pressure environments, such as outer space. In particular, there is a need for an improved cuff seal for a counter pressure garment in the area, for example, of a wearer's ankle or wrist. Irrespective of the body area, a cuff seal is needed which can hold a counter pressure equal to the breathing pressure inside a full pressure suit. Another need is for a spacesuit cuff seal that not only provides adequate counter pressure to the tissue but is also simple in design, easy to use, and can be quickly donned and doffed.

SUMMARY OF THE INVENTION

The present invention is directed to a cuff seal assembly for a counter pressure garment over a blood supplied tissue and comprises a base member; and a seal member disposed within the base member, with the seal member comprising a hinge portion and contact portion which is capable of flexure about the hinge portion.

These and other features, aspects and advantages of the present invention will become better understood with reference to the following drawings, description and claims.

DETAILED DESCRIPTION OF THE INVENTION

Figure 1:
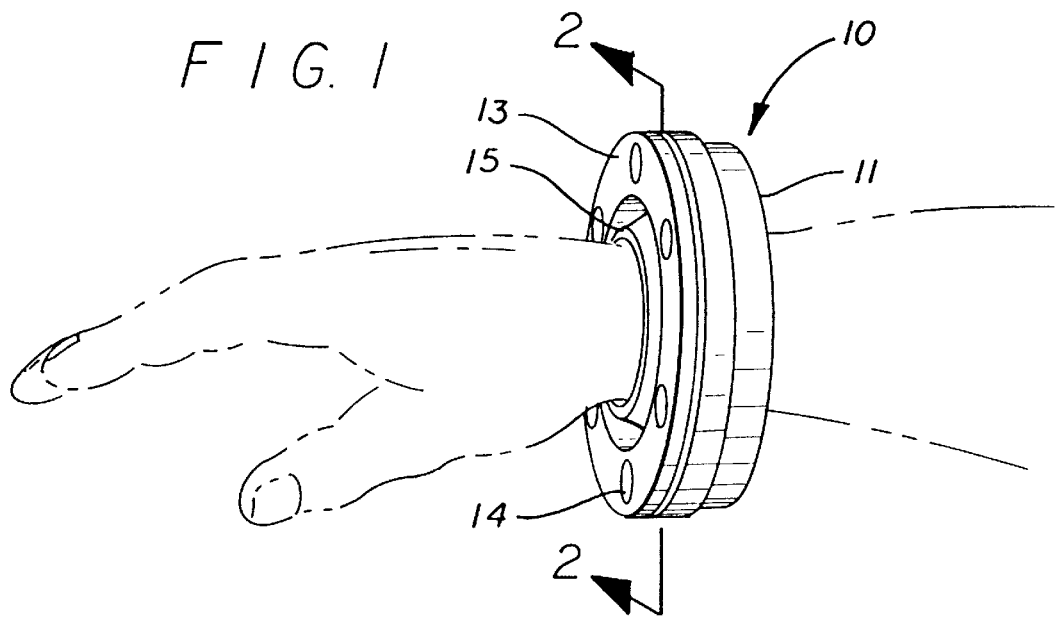
FIG. 1 depicts a wrist of an arm within one embodiment of a seal assembly for a counter pressure garment according to the present invention.

FIG. 1 depicts one embodiment of a cuff seal or seal assembly 10 according to the present invention. In the embodiment shown in FIG. 1, the cuff seal 10 is used for a wrist of a human. The cuff seal 10 is intended to fit between a mechanical counter pressure or vascular support garment and a full pressure suit (not shown). In particular, the cuff seal 10 can be inserted, for example, at the end of a full pressure sleeve joined to a partial pressure glove. The cuff seal 10 can seal the pressure within the suit when such garment is pressurized, for example, with about 222 mm Hg. The sealing occurs by a seal member 15 of the cuff seal 10 compressing against the wrist. Even though the cuff seal 10 is described in this embodiment in the context of being used about the wrist, the present invention contemplates that the cuff seal 10 can be used over other parts of a body, such as an ankle. Further, while the seal assembly 10 is discussed in the context of a spacesuit, other vascular support garments can be applicable, such as high altitude aircraft suits and shuttle launch/entry suits.

More specifically, the cuff seal 10 includes a base member 11 that is generally rigid and can be made of various materials that are resistant to the environment. In the environment of outerspace, the base member 11 is preferably constructed of stainless steel. The base member 11 is configured and dimensioned to encircle the blood supplied tissue to be counter pressurized and at which the suit pressure is to be sealed. With a wrist being the blood supplied tissue, the base member 11 can be generally cylindrically shaped with an aperture 21 therein. Thus, the base member 11 and aperture 21 can be considered as disposed about a longitudinal axis extending parallel to the length (i.e., height) of the base member 11.

Although the base member 11 is circular in this embodiment, the present invention is not limited to such configuration and other configurations can be usefully employed. Still, a circular shape is preferable for this embodiment because the present invention envisions the base member 11 being insertable into a ball bearing assembly or race ring of a sleeve of the spacesuit (not shown). That would enable rotation of the cuff seal 10 relative to the sleeve of the spacesuit that is non-rotating, such as found in the current design of the full pressure NASA EMU spacesuit.

Figure 2:
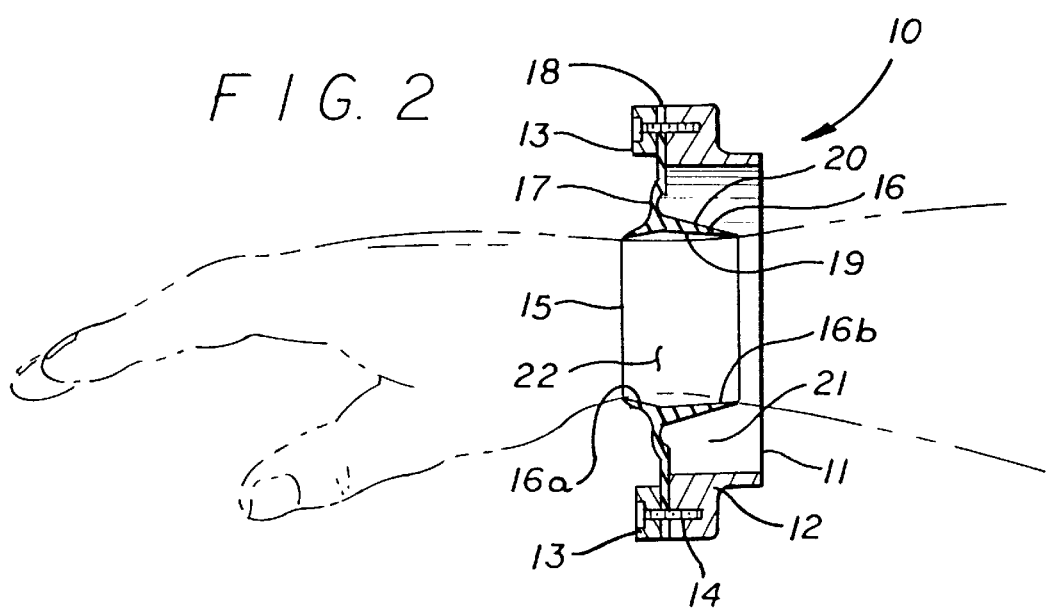
FIG. 2 is a cross-sectional view of the seal assembly depicted in FIG. 1.

The base member 11 includes an integrally formed edge portion 12 that extends around the entire outer area or circumference of the member 11. The edge portion 12 has a generally flat surface area that is capable of being juxtaposed to and receiving a portion of the seal member 15 in the manner described below. By so doing, the seal member 11 can be rotationally and longitudinally fixed about the longitudinal axis of the base member 11, as further described below. As shown in FIGS. 1 and 2, the height of the edge portion 12 extends over about one half of the total longitudinal length or height of the base member 11, although the amount of the extension can vary. The edge portion 12 thus creates a wider overall circumference of the base member 11 where such portion 12 is present and when compared to part of the base member 11 over which the edge portion 12 is absent. The outer surface of the base member 11 thereby has a stepped configuration. The portion of the base member 11 without the edge portion 12 can then be inserted into the bearing assembly mentioned above.

The seal member 15 is a generally flexible member and preferably of a single piece construction. The member 15 can be made of various materials such as silicone rubber. Preferably, for the environment of outer space, a protective coating can be used over the member 15. The seal member 15 is configured and dimensioned to encircle the tissue to be counter pressurized and to be pressure sealed. The seal member 15 is partially cylindrically shaped and provides an aperture 22 therein which can fit about the wrist in this embodiment. Unlike the aperture 21 of the base member 11, the aperture 22 should preferably be configured and dimensioned to more closely match the configuration and dimensions of the tissue at which the pressure seal is to occur. Therefore, if the cuff seal 10 is to be used about a wrist, the aperture 22 is preferably cylindrical in shape.

The seal member 15 includes a rim portion 18 that is a generally flat annular portion that extends about the entire circumference of the seal member 15. The configuration and dimension of the rim portion 18 are such that the rim portion 18 can be juxtaposed and mated to the generally flat surface of the edge portion 12 of the base member 11, as described above. With the rim portion 18 mated to the edge portion 12, an annular shaped plate member 13 can be placed over the rim portion 18. A plurality of screws 14 can be inserted through the plate member 13, rim portion 18 and into the edge portion 12. Thereby, the seal member 15 becomes stationarily attached to the base member 11, both rotationally and longitudinally about the longitudinal axis of the base member 11.

Extending from the rim portion 18 is a hinge portion 17 that forms, in this first embodiment, another integral part of the seal member 15. The hinge portion 17 extends around the circumference of the aperture 22 and is convexly shaped to extend towards the hand shown in FIGS. 1 and 2. In other words, the hinge portion 17 is convex in the direction that the tissue will move for insertion through the cuff seal 10 when donned. The convexity enables the aperture 22 of the seal member 15 to more easily enlarge for insertion of the hand or other tissue but return to a tight fit under pressure. The hinge portion 17 is dimensioned to be large enough to support a contact portion 16 yet small enough to allow the contact portion 16 to flex about the hinge portion 17.

The contact portion 16 is shaped to form an aperture 22 therein. The contact portion 16 comprises an interior surface 19 and an exterior surface 20. The contact portion 16 is generally configured and dimensioned to match the configuration and dimension of the tissue at which the pressure seal is to occur. In the context of the hand and wrist shown in FIGS. 1 and 2, the contact portion 16 is cylindrical in shape and of a dimension such that a hand can pass through the aperture 22.

For this particular embodiment, the surfaces 19, 20 are convexly shaped away from the longitudinal axis of the base member 11, with the apex of the convex being off center from the entire longitudinal length of the aperture 22 and towards the hand, as shown in FIG. 2. The position of the apex is generally where the hinge portion 17 meets the contact portion 16. The positioning of the apex allows the contact portion 16 to more easily flex about the hinge portion 17 as the hand passes through the aperture 22 during donning and doffing. And with such flexure, the contact portion 16 can more readily accommodate the varying contours and radial dimensional changes of the hand.

After the hand passes through the contact portion 16 and the wrist lies within the aperture 22, a leading edge 16a and a trailing edge 16b of the contact portion 16 should be in pressure contact with the wrist. The leading edge 16a comprises the circumferential part of the distal end of the contact portion 16 where the hand exits from the cuff seal 10. The trailing edge 16b comprises the circumferential part of the distal end of the contact portion 16 where the hand enters the cuff seal 10. As seen in FIG. 2, upon the wrist initially being inserted into the cuff seal 10, the part of the contact portion 16 intermediate the leading and trailing edges 16a, b is generally not in pressure contact with the wrist.

For the leading and trailing edges 16a, b which are in pressure sealing contact with the wrist, the amount of contact should be that which is minimally sufficient to hold a gas pressure as it begins to flow into the spacesuit. Thereby, the ease of donning and doffing remain maximized. As the gas pressure is increased within the spacesuit, the contact portion 16 moves or flexes towards the longitudinal axis of the base member 11 (i.e., towards the wrist) and exerts increased pressure on the wrist. More specifically, the apex area of the contact portion 16 can move or flex towards the wrist as the hinge portion 17 stretches to allow such movement or flexure. Thereby, the leading and trailing edges 16a, b exert greater pressure on the wrist with increased suit pressure and provide a greater seal. Preferably, in the context of a spacesuit, the contact portion 16 can exert a pressure on the wrist sufficient to maintain at least about 222 mm Hg within the suit.

Figure 3:
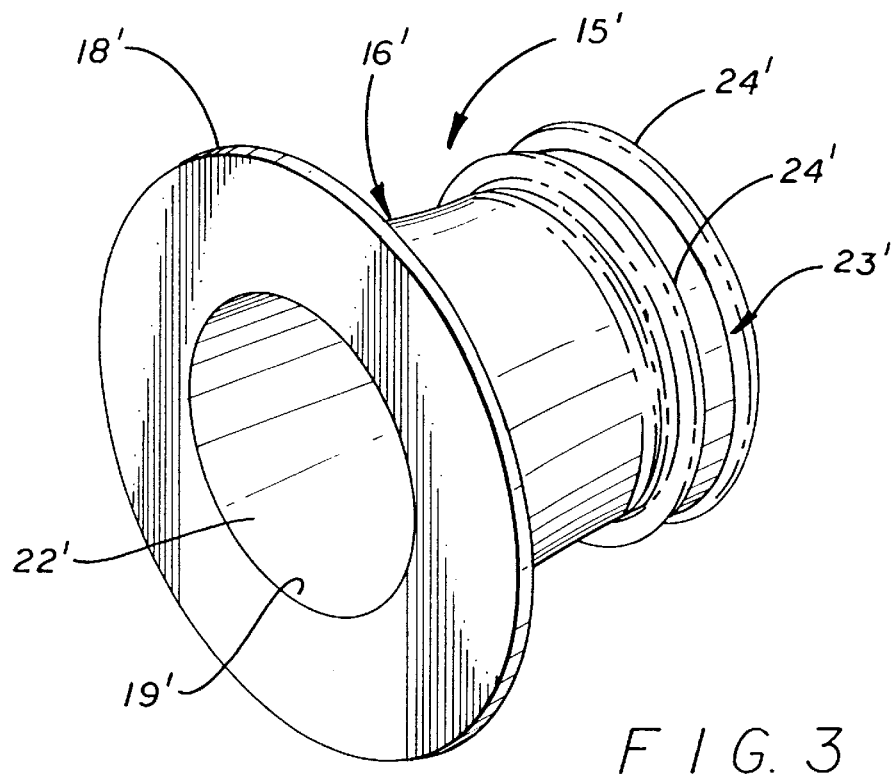
FIG. 3 an elevated perspective view of a seal member for a second embodiment of a seal assembly for a counter pressure garment according to the present invention.
Figure 4:
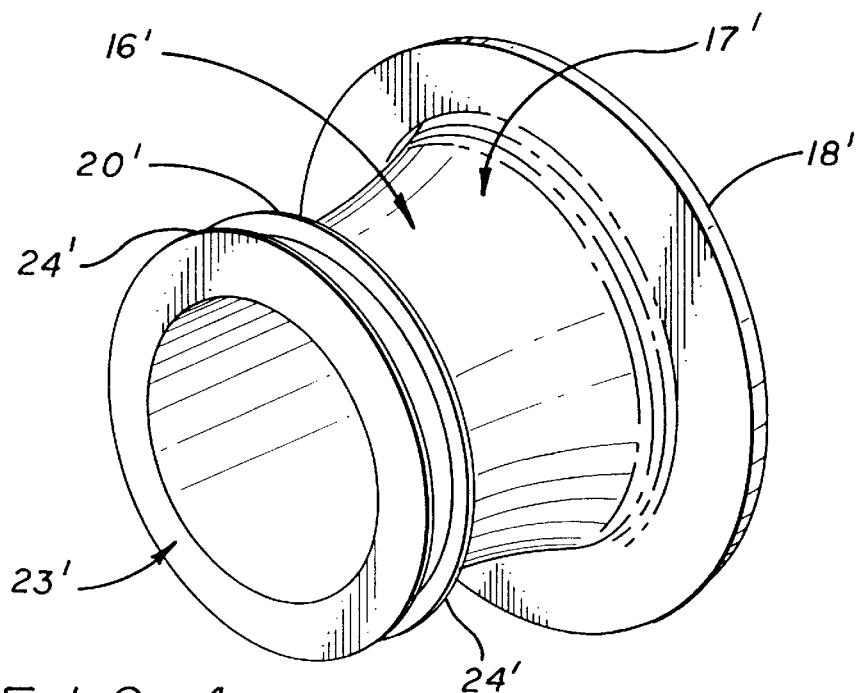
FIG. 4 is another elevated perspective view of the seal member depicted in FIG. 3.
Figure 5:
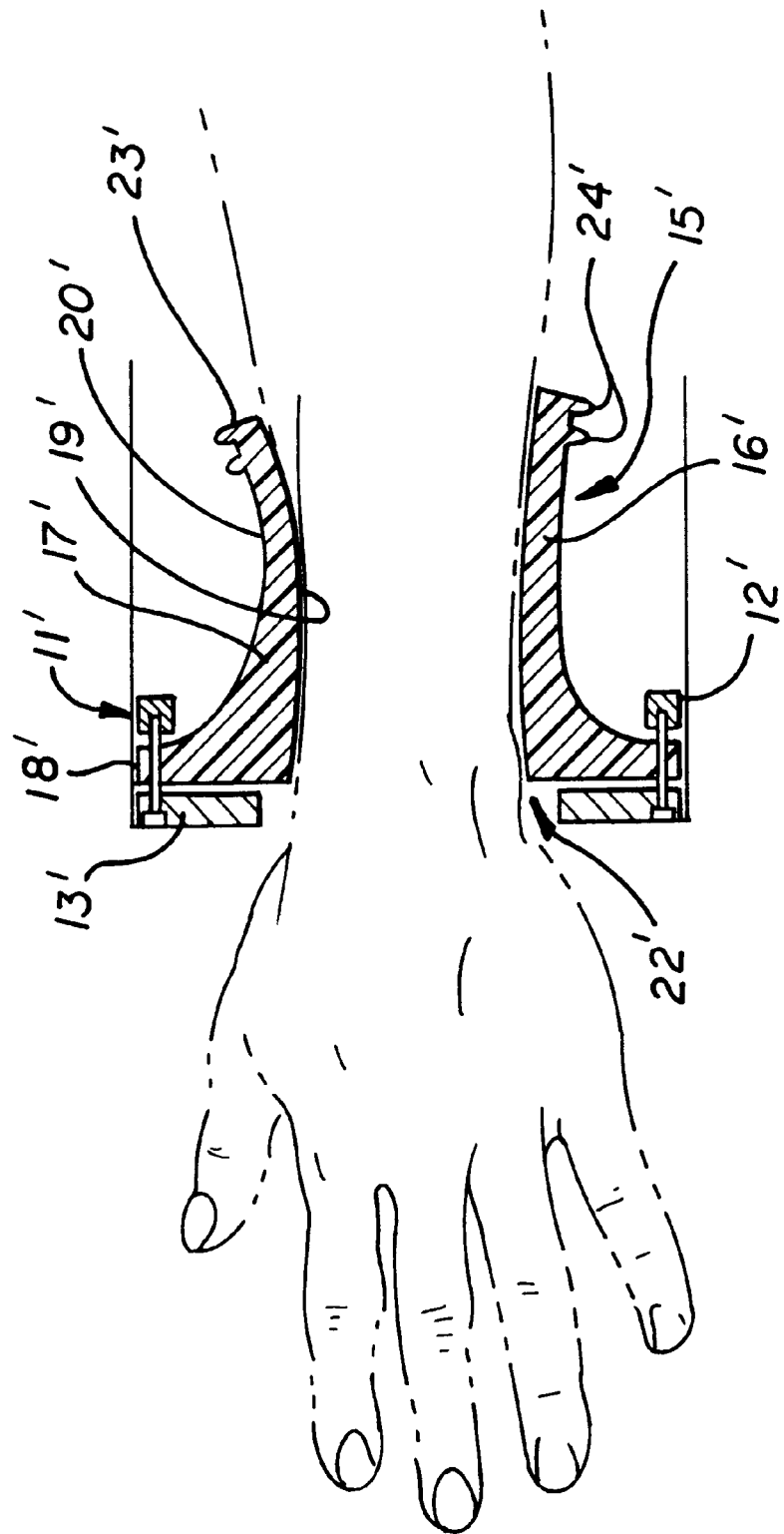
FIG. 5 is a cross-sectional view of the second embodiment of the seal assembly according to the present invention.

FIGS. 3–5 show a second embodiment of the present invention. For this second embodiment, a seal member 15' can be used in conjunction with a base member 11' similar or identical to the base member 11 used in the first embodiment. However, as described below, the preferred base member 11' in this embodiment is not identical to the base member 11 of the first embodiment. The seal member 15' of this second embodiment has the same general cylindrical shape as the seal member 15 in the first embodiment. As such, the seal member 15' defines an aperture 22' disposed about a longitudinal axis extending parallel to a height or length of the seal member 15'.

As with the first embodiment, the seal member 15' includes a rim portion 18' that is annularly shaped. Extending from the rim portion 18' is a hinge portion 17' that is an integrally formed part of the seal member 15' in this embodiment. The hinge portion 17' extends around the circumference of the aperture 22' and is convexly shaped towards the aperture 22'. At such, the hinge portion 17' is convex in the direction that the tissue will move for insertion through aperture 22' when the cuff seal is donned.

The hinge portion 17' is flexibly attached to a contact portion 16' that is also an integrally formed part of the seal member 15'. In being so attached, the contact portion 16' can move and flex about the hinge portion 17', such as when the cuff seal is being donned or doffed, as well as when gas pressure is applied to the contact portion 16'. An interior surface 19' and an exterior surface 20' form the contact portion 16'. A leading edge or area of the contact portion 16' is disposed at an insertion end portion 23' of the seal member 15', while a trailing edge or area of the contact portion 16' is adjacent to the hinge portion 17'.

As with the first embodiment, the contact portion 16' in this embodiment is configured and dimensioned to have the interior surface 19' in pressure contact with the wrist when the wrist is initially inserted into the aperture 22'. However, in contrast to the first embodiment, this second embodiment of the contact portion 16' is substantially only cylindrical in shape rather than also having a convexity to it. Nevertheless, and as with the first embodiment, the amount of pressure sealing contact between the contact portion 16' and the wrist should be that which is minimally sufficient to hold a gas pressure as it begins to flow into the spacesuit and about the exterior surface 20'.

From the contact portion 16' is attached the insertion end portion 23' which is also generally cylindrical in shape. The end portion 23' allows a hand to be inserted into the seal member 15', move past the contact portion 16' and out of the seal member 15' at the rim portion 18'. In this second embodiment, the insertion end portion 23' includes a pair of ribs 24' that enables a tight, uniform contact point between the tissue and the insertion end portion 23'. Of course, the number of ribs 24' need not be limited to two and may vary in number while still accomplishing the above function.

As mentioned above, the base member 11' can be but need not be identical to the base member 11 of the first embodiment. As shown in FIG. 5, the base member 11' is an annularly shaped ring that can be juxtaposed to the rim portion 18'. With such juxtaposition, an annularly shaped plate member 13' can be mated to the base member 11' and the rim portion 18' with a plurality of screws (not shown), as in the first embodiment shown in FIG. 2. Thereby, the seal member 15' is rotationally and longitudinally fixed about a longitudinal axis of the base member 11', as in the first embodiment. It can also be seen in FIG. 5 that an inner diameter of the plate member 13' is smaller than an inner diameter of the base member 11', while their respective outer diameters are approximately the same. Such relative dimensions tend to prevent the insertion end portion 23' from being pushed towards and/or passed through the base member 11' as a hand is passed through the seal member 15'.

In either embodiment of the invention, it can be seen that as the gas pressure is increased within the spacesuit, pressure is exerted on the exterior surface 20 (20') of the contact portion 16 (16'). The pressure exerted thereon causes the contact portion 16 (16') to move or flex towards the longitudinal axis of the base member 11 (11') (i.e., towards the wrist). Accordingly, there is increased contact or counter pressure exerted on the wrist. As the contact pressure is increased, the pressure seal between the contact portion 16 (16') and the wrist is enhanced. When the spacesuit needs to be doffed, gas pressure within the spacesuit is decreased. As the pressure within the suit is decreased, the pressure on the contact portion 16 (16') is decreased. And as the pressure on the contact portion 16 (16') is decreased, so is the amount of pressure on the tissue. Eventually, the amount of the pressure on the tissue is decreased to the point where the hand can be easily withdrawn from the cuff seal 10.

As can be appreciated, the cuff seal 10 according to the present invention provides a simple design for sealing pressure at areas of a counter pressure garment which require various body movements, such as rotational and flexure. The cuff seal 10 can be particularly useful as a pressure seal over a wrist. In the environment of space, the cuff seal 10 is capable of maintaining a counter pressure on a body at about 222 mm Hg. Because of the contact portion 16 (16') being able to flex about the hinge portion 17 (17') whilebeing fixed rotationally and longitudinally with respect to the longitudinal axis of the base member 11 (11'), the cuff seal 10 allows easy donning and doffing.

It should be understood, of course, that the foregoing relates to preferred embodiments of the invention and that modifications may be made without departing from the spirit and scope of the invention as set forth in the following claims.

We claim:

1. A cuff seal for a counter pressure garment to cover blood supplied tissue, comprising:
   a base member; and
   a seal member fixed to said base member and disjoined to said garment, said seal member comprising a contact portion, a hinge portion fixed to said contact portion, and a rim portion fixed to said hinge portion said contact portion having an insertion end portion and at least one rib disposed at said insertion end portion.

2. The cuff seal of claim 1, wherein said rim portion is stationarily fixed to said base member.

3. The cuff seal of claim 1, wherein said contact portion is capable of flexion upon said tissue being inserted into said cuff seal.

4. The cuff seal of claim 1, wherein said contact portion is capable of flexion upon a gas pressure being exerted upon said contact portion.

5. The cuff seal of claim 1, wherein said contact portion is capable of sealing a pressure of at least about 222 mm Hg within said garment.

6. A garment seal for maintaining a counter pressure of at least about 222 mm Hg on a blood supplied tissue, comprising:
   a base member having a first inner diameter;

a plate member juxtaposed to said base member, said plate member having a second inner diameter that is less than said first inner diameter; and a seal member fixed to said base member, said seal member comprising a rim portion, a hinge portion fixed to said rim portion, and a contact portion fixed to said hinge portion, said contact portion being capable of moving towards said tissue upon a gas pressure being exerted upon said seal member.

7. The seal of claim 6, wherein said rim portion is stationarily fixed to said base member.

8. The seal of claim 6, wherein said contact portion is capable of flexion about said hinge portion.

9. The seal of claim 6, wherein said contact portion is capable of being in pressure sealing contact with said tissue in the absence of a gas pressure being applied to said seal member.

10. The seal of claim 6, wherein said base member is configured to be capable of insertion into a ball bearing assembly in said garment such that said base member can rotate within said bearing assembly.

11. A cuff seal for a spacesuit, comprising:

a base member positioned about a longitudinal axis and having a first inner diameter;

a plate member juxtaposed to said base member, said plate member having a second inner diameter that is less than said first inner diameter; and a seal member comprising a rim portion fixed about said longitudinal axis and to said based member, a hinge portion flexibly attached to said rim portion, and a contact portion flexibly attached to said hinge portion, said contact portion being capable of moving in a direction substantially perpendicular to said longitudinal axis, with said contact portion having an insertion end portion and at least one rib disposed at said insertion end portion.

12. The cuff seal of claim 11, wherein said base member comprises an edge portion that can receive said rim portion.

13. The cuff seal of claim 12, further comprising a plate member which can be stationarily attached to said edge portion and said rim portion.

14. The cuff seal of claim 11, wherein said contact portion is cylindrically shaped.

15. The cuff seal of claim 11, wherein said contact portion comprises an interior surface which is convexly shaped.

16. The cuff seal of claim 11, wherein said hinge portion is convexly shaped.

* * * * *